United States Patent
Al-Dahle et al.

(10) Patent No.: US 10,940,788 B2
(45) Date of Patent: Mar. 9, 2021

(54) EMBEDDED LIGHT SENSORS

(71) Applicant: Apple Inc., Cupertino, CA (US)

(72) Inventors: Ahmad Al-Dahle, San Jose, CA (US); Jean-Marie Bussat, Mountain View, CA (US)

(73) Assignee: Apple Inc., Cupertino, CA (US)

(*) Notice: Subject to any disclaimer, the term of this patent is extended or adjusted under 35 U.S.C. 154(b) by 201 days.

(21) Appl. No.: 15/762,545

(22) PCT Filed: Sep. 22, 2016

(86) PCT No.: PCT/US2016/053170
§ 371 (c)(1),
(2) Date: Mar. 22, 2018

(87) PCT Pub. No.: WO2017/053607
PCT Pub. Date: Mar. 30, 2017

(65) Prior Publication Data
US 2019/0077299 A1 Mar. 14, 2019

Related U.S. Application Data

(60) Provisional application No. 62/232,822, filed on Sep. 25, 2015.

(51) Int. Cl.
*B60Q 1/00* (2006.01)
*G01S 7/481* (2006.01)
(Continued)

(52) U.S. Cl.
CPC ............ *B60Q 1/0023* (2013.01); *B60Q 1/24* (2013.01); *F21S 41/40* (2018.01); *G01S 7/4813* (2013.01); *G01S 17/26* (2020.01)

(58) Field of Classification Search
CPC ....... B60Q 1/0023; B60Q 1/24; G01S 7/4823; G01S 17/102
(Continued)

(56) References Cited

U.S. PATENT DOCUMENTS 3,862,415 A 1/1975 Harnden, Jr. et al.
2015/0070207 A1* 3/2015 Millar .................. G01S 13/006
342/174
(Continued)

FOREIGN PATENT DOCUMENTS

EP 2806288 11/2014

*Primary Examiner* — Kevin K Pyo
(74) *Attorney, Agent, or Firm* — Robert C. Kowert; Kowert, Hood, Munyon, Rankin & Goetzel, P.C.

(57) ABSTRACT

Some embodiments provide a vehicle which includes a one or more sets of light emitter devices and sensor devices included in a common element assembly of the vehicle which includes a common window element via which the light emitter devices and sensor devices can interact with an external environment in which the vehicle is located. The sensor devices and light emitter devices can be communicatively coupled, and operation of the light emitter devices and sensor devices can be adjustably controlled to mitigate interference by the light emitter devices with sensor data representations generated by the sensor devices. The window element can include a reflection-mitigating layer which mitigates reflection of light beams emitted by one or more light emitter devices in an assembly towards one or more sensor elements of one or more sensor devices included in the same assembly.

20 Claims, 5 Drawing Sheets

(51) Int. Cl.
*G01S 17/26* (2020.01)
*F21S 41/40* (2018.01)
*B60Q 1/24* (2006.01)

(58) Field of Classification Search
USPC .............................................. 250/221, 222.1
See application file for complete search history.

(56) References Cited

U.S. PATENT DOCUMENTS

| 2016/0251000 A1* | 9/2016 | Loman ..................... G01J 5/10 137/1 |
| 2016/0377719 A1* | 12/2016 | Moriguchi .............. G01S 17/42 356/5.01 |
| 2019/0257922 A1* | 8/2019 | McCord ................. F21S 41/16 |

* cited by examiner

EMBEDDED LIGHT SENSORS

This application is a 371 of PCT Application No. PCT/US2016/053170, filed Sep. 22, 2016, which claims benefit of priority to U.S. Provisional Patent Application No. 62/232,822, filed Sep. 25, 2015. The above applications are incorporated herein by reference. To the extent that any material in the incorporated application conflicts with material expressly set forth herein, the material expressly set forth herein controls.

BACKGROUND

Technical Field

This disclosure relates generally to vehicle sensors, and in particular to sensors which are embedded in light assemblies included in a vehicle.

Description of the Related Art

Vehicles are often navigated through environment in which various elements are located, where vehicles are navigated to avoid collisions with such elements. Elements in an environment can include static elements which do not change location within an environment, including plant life structures, etc. Elements in an environment can include dynamic elements which can change location within an environment, including vehicles, humans, animal life, etc.

In some cases, vehicles include sensors which monitor one or more portions of an environment in which the vehicle is located. The sensors can generate sensor data which can be utilized to augment navigation of a vehicle through an environment. For example, sensor data generated by sensors of a vehicle which are configured to monitor a portion of an environment proximate to a rear end of the vehicle can be utilized to provide, to an occupant of the vehicle that is a driver of the vehicle, a graphical representation of the portion of the environment via a user interface, and the driver can utilize the graphical representation to augment situational awareness of the environment when manually navigating the vehicle through the environment. In another example, an autonomous navigation system included in a vehicle can utilize sensor data generated by one or more sensors of the vehicle to autonomously navigate the vehicle through the environment.

SUMMARY OF EMBODIMENTS

Some embodiments provide a vehicle which includes one or more element assemblies which can provide concurrent light emission and environment monitoring via a common window element in the vehicle. An element assembly includes a housing configured to be installed in a vehicle, wherein the housing comprises an interior space which is at least partially enclosed by the housing and is configured to support at least one light emitter device and at least one sensor device coupled to the housing within the interior space; and a window element coupled to the housing, wherein the window element completes an enclosure of the interior space and establishes a transparent barrier between the interior space and an external environment, such that the at least one light emitter device and at least one sensor device coupled to the housing within the interior space are configured to interact with the external environment via a common window element.

Figure 1:
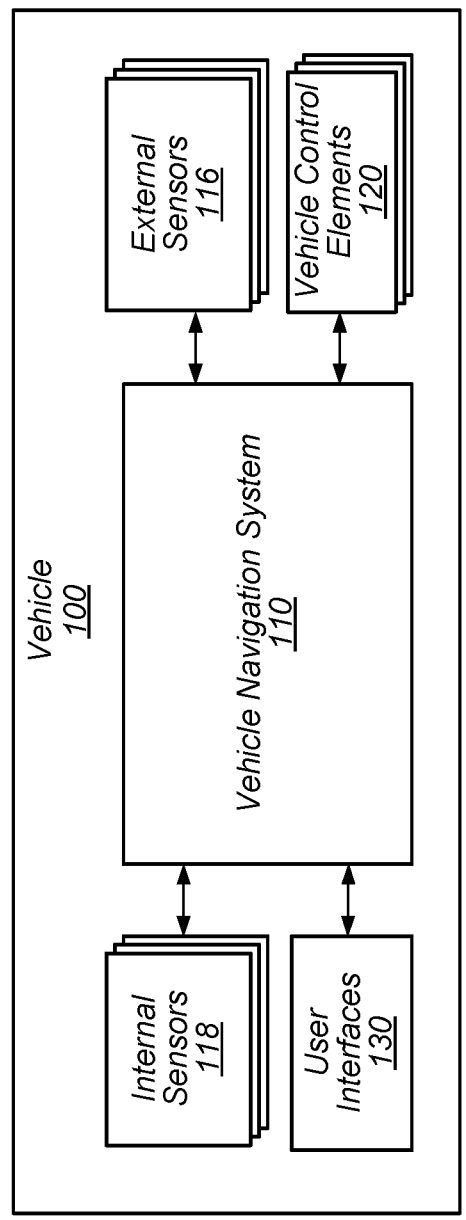
FIG. 1 illustrates a vehicle which includes a vehicle navigation system communicatively coupled to multiple sensor devices and vehicle control elements, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

FIG. 1 illustrates a vehicle which includes a vehicle navigation system communicatively coupled to multiple sensor devices and vehicle control elements, according to some embodiments.

Vehicle 100 will be understood to encompass one or more vehicles of one or more various configurations which can accommodate one or more occupants, including, without limitation, one or more automobiles, trucks, vans, etc. Vehicle 100 can include one or more interior cabins configured to accommodate one or more human occupants (e.g., passengers, drivers, etc.), which are collectively referred to herein as vehicle "users". An interior cabin can include one or more user interfaces, including vehicle control interfaces (e.g., steering wheel, throttle control device, brake control device), display interfaces, multimedia interfaces, climate control interfaces, some combination thereof, or the like. Vehicle 100 includes various control elements 120 which can be controlled to navigate ("drive") the vehicle 100 through the world, including navigate the vehicle 100 along one or more routes. In some embodiments, one or more control elements 120 are communicatively coupled to one or more user interfaces included in an interior cabin of the vehicle 100, such that the vehicle 100 is configured to enable a user to interact with one or more user interfaces to control at least some of the control elements 120 and manually navigate the vehicle 100. For example, vehicle 100 can include, in the interior cabin, a steering device, throttle device, and brake device which can be interacted with by a user to control various control elements 120 to manually navigate the vehicle 100.

Vehicle 100 includes a vehicle navigation system (VNS) 110 which is configured to navigate vehicle 100 based on driving commands generated at one or more of the user interfaces 130, the VNS 110 itself, some combination thereof, etc. VNS 110 is communicatively coupled to at least some of the control elements 120 of the vehicle and is configured to control one or more of the elements 120 to navigate the vehicle 100 based on one or more driving commands. As used herein, navigation of the vehicle 100, including one or more of manual navigation and autonomous navigation, refers to controlled navigation ("driving") of vehicle 100 along at least a portion of a route based upon active control of the control elements 120 of the vehicle 100, including steering control elements, throttle control elements, braking control elements, transmission control elements, etc. independently of control element input commands from a user of the vehicle. Autonomous navigation can include the VNS 110 executing active control of driving control elements 120 while enabling manual override of control of elements 120 via manual input from a user via user interaction with one or more user interfaces 130 included in the vehicle. For example, VNS 110 can autonomously navigate vehicle 100 in the absence of input commands from a vehicle user via one or more user interfaces 130 of the vehicle 100, and VNS 110 can cease control of one or more elements 120 in response to a user-initiated input command to the one or more elements 120 from one or more user interfaces 130 of the vehicle 100.

Vehicle 100 includes a set of one or more external sensor devices 116, also referred to as external sensors 116, which can monitor one or more aspects of an external environment relative to the vehicle 100. Such sensor devices can include one or more camera devices, video recording devices, infrared sensor devices, radar devices, ultrasonic sensor devices, stereo sensor devices, light-scanning devices including LIDAR devices, precipitation sensor devices, ambient wind sensor devices, ambient temperature sensor devices, position-monitoring devices which can include one or more global navigation satellite system devices (e.g., GPS, BeiDou, DORIS, Galileo, GLONASS, etc.), some combination thereof, or the like.

Camera devices can include camera devices configured to capture images of an environment within one or more various sets of light wavelengths. For example, some camera devices are configured to capture images of an environment within a range of wavelengths which correspond to the wavelengths which can be visually observed by humans;

such camera devices can include visible light cameras. In another example, some camera devices are configured to capture images of an environment within a range of wavelengths which are longer than wavelengths which correspond to the wavelengths which can be visually observed by humans; such camera devices can include infrared light cameras, IR cameras, near-IR cameras, etc.

One or more of external sensor devices 116 can generate sensor data associated with an environment as the vehicle 100 navigates through the environment. Sensor data generated by one or more sensor devices 116 can be communicated to VNS 110 as input data, where the input data can be used by the route characterization module 112 to develop, update, maintain, etc. a virtual characterization of one or more portions of the routes through which the vehicle 100 is being navigated. External sensor devices 116 can generate sensor data when the vehicle 100 is being manually navigated, autonomously navigated, etc.

Vehicle 100 includes a set of one or more internal sensors 118, also referred to as internal sensor devices 118, which can monitor one or more aspects of vehicle 100. Such sensors can include camera devices configured to collect image data of one or more users in the interior cabin of the vehicle, control element sensors which monitor operating states of various control elements 120 of the vehicle, accelerometers, velocity sensors, component sensors which monitor states of various automotive components (e.g., sensors which monitor wheel-turning dynamics of one or more wheels of the vehicle), etc. One or more of internal sensor devices 118 can generate sensor data associated with the vehicle 100 as the vehicle 100 navigates through the environment.

Vehicle 100 includes one or more sets of user interfaces 130. One or more interfaces 130 can include one or more user interface devices, also referred to as user interfaces, with which a user of vehicle 100 can interact to interact with one or more portions of VNS 110, control elements 120, etc. For example, an interface 130 can include a display interface with which a user can interact to command VNS 110 to engage autonomous navigation of vehicle 100 along one or more particular routes, based at least in part upon one or more virtual characterizations of one or more portions of the route. In another example, an interface 130 can include a display interface which provides, to a user, a graphical representation of one or more portions of an external environment in which the vehicle 100 is located based on sensor data generated by one or more external sensor devices 116.

Figure 2:
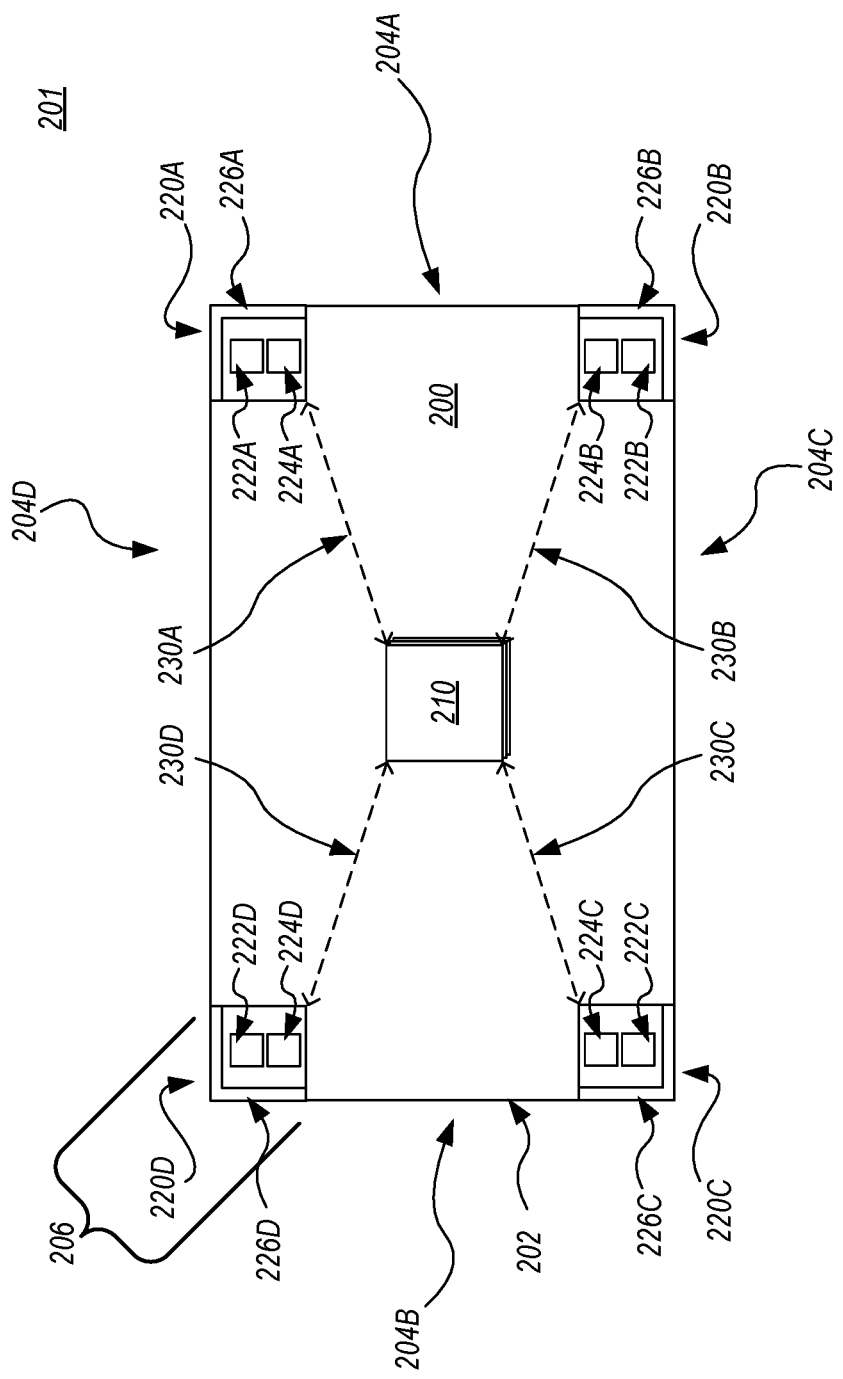
FIG. 2 illustrates a vehicle which includes a vehicle navigation system communicatively coupled to multiple element assemblies which each include one or more light emitter devices and one or more sensor devices, according to some embodiments.

FIG. 2 illustrates a vehicle which includes a vehicle navigation system communicatively coupled to multiple element assemblies which each include one or more light emitter devices and one or more sensor devices, according to some embodiments. The vehicle 200 illustrated in FIG. 2 can be included in any of the embodiments of vehicles included herein, including the vehicle 100 illustrated in FIG. 1.

In some embodiments, a vehicle includes one or more vehicle control element assemblies, also referred to herein as element assemblies, which comprise a set of elements, including one or more vehicle control elements, sensor devices, etc. which interact with one or more portions of an external environment via a common window of the assembly. An element assembly can be installed in a gap within a body of the vehicle where a window of the element assembly enables interaction between multiple elements, including one or more vehicle control elements, sensor devices, etc. with the external environment without requiring additional gaps in the body of the vehicle to accommodate separate vehicle control elements, sensor devices, etc.

In some embodiments, element assemblies included in a vehicle include one or more light assemblies which each include one or more light emitter devices. A light emitter device can include one or more of a headlight device, a brake light device, a turn light device, a hazard light device, a reverse-drive light device, some combination thereof, etc. A light emitter device emits a beam of light, through a window in the element assembly in which the light emitter device is located, and into a portion of the external environment in which the vehicle is located. Various light emitter devices included in various element assemblies provide various functionalities. For example, a headlight device, installed in an element assembly which is itself installed proximate to a front end of a vehicle and includes a window which is oriented at least partially towards a forward direction relative to the vehicle, can emit a light beam which illuminates a portion of the external environment which is "ahead" of the vehicle and enables one or more of manual perception of various illuminated elements in the environment, by a driver of the vehicle, when the vehicle is being manually navigated through the environment, autonomous characterization of various illuminated elements of the environment, by a VNS included in the vehicle, when the vehicle is being autonomously navigated through the environment, etc. In another example, various brake light devices, turn light devices, reverse-drive light devices, etc. can provide visually-observable indications, to various traffic participants, pedestrians, drivers, etc. located in the environment proximate to the vehicle, of one or more various navigation actions when are presently being executed by the vehicle, may be imminently executed by the vehicle, etc.

In some embodiments, an element assembly which includes a light emitter device includes one or more cleaning elements which are configured to remove environmental elements, including particulate matter, precipitation, etc. from a window of the assembly through which the light emitter device is configured to direct an emitted light beam, thereby mitigating degradation of the beam as a result of at least partial obstruction of the window element by environmental elements.

In some embodiments, sensor data generated by a sensor device can be at least partially degraded as a result of the sensor device interacting with the external environment via an element which is at least partially obstructed by environmental elements. For example, where a sensor device includes a light beam scanning device, which can include a LIDAR device, which directs a light beam into the environment via an aperture and receives reflected light beams at an aperture, transmission of emitted and reflected light beams across one or more apertures of the sensor device can be at last partially obstructed as a result of one or more environmental elements at least partially obstructing the one or more apertures.

In some embodiments, an element assembly which includes one or more sensor devices which are configured to interact with the environment via a common window with one or more light emitter devices in the element assembly mitigates degradation of sensor monitoring of the environment based on a cleaning element which is configured to remove environmental elements from a surface of the common window. The cleaning element, which can be associated with the light emitter device included in the assembly, mitigates effects of environmental element buildup on an external surface of the assembly window upon performance of both the one or more light emitter devices and sensor devices included in the assembly.

In some embodiments, including one or more sensor devices in one or more element assemblies which include one or more light emitter devices results in augmented sensor device coverage of an external environment around the vehicle. For example, a vehicle can include element assemblies positioned at various locations around the exterior of the vehicle which result in visual indications provided by various light emitter devices included therein to be visually observable by traffic participants, pedestrians, etc. located at various positions in the external environment relative to the vehicle. Element assemblies which include light emitter devices can be installed in various gaps of the vehicle body at various locations on various ends of the vehicle, and including sensor devices in the element assemblies can result in sensor devices being positioned at the various locations without requiring additional gaps in the vehicle body.

In the illustrated embodiment shown in FIG. 2, vehicle 200 is located within external environment 201 and includes a body 202, at least one computer system 210, and a set of element assemblies 220A-D installed in various separate gaps 206 in the body 202 which are proximate to various ends 204A-D of the vehicle 200.

Each element assembly 220A-D includes a separate window element 226A-D and a separate set of light emitter devices 224A-D and sensor devices 222A-D which are configured to interact with various portions of the environment 201 via a common window 226A-D included in the respective element assembly 220A-D. As further shown, one or more portions of each assembly 220A-D, including one or more light emitter devices 224A-D, sensor devices 222A-D, etc. can be communicatively coupled to the at least one computer system 210 included in the vehicle via one or more communication links 230A-D. A communication link can include one or more communication conduits which communicatively couple one or more computer systems 210 with one or more portions, including one or more light emitter devices 224, sensor devices 222, etc., of one or more element assemblies 220A-D. In some embodiments, a window, also referred to herein as a window element, can be comprised of one or more of glass, one or more transparent polymer materials, one or more polycarbonate materials, some combination thereof, etc.

As shown, each element assembly 220 is positioned proximate to a separate set of ends 204 of the vehicle 200. As a result, while separate light emitter devices 224 included in the separate assemblies 220 can emit one or more light beams into separate portions of the environment 201 which are proximate to separate ends 204 of the vehicle 200, the separate sensor devices 222 included in the separate assemblies 220 can monitor separate portions of the environment 201 which are proximate to separate ends 204 of the vehicle 200. For example, sensor devices 222A included in assembly 220A can monitor portions of environment 201 which are proximate to ends 204A, 204D of vehicle 200, while sensor devices 222B included in assembly 220B can monitor portions of environment 201 which are proximate to ends 204B, 204C of vehicle 200.

Separate element assemblies 220 can include separate sets of light emitter devices 224, sensor devices 222, some combination thereof, etc. For example, assembly 220A can include a set of light emitter devices 224A which include a headlight device configured to emit one or more light beams into a portion of environment 201 which is proximate to end 204A and a turn light device configured to emit one or more light beams into portions of the environment 201 which are proximate to ends 204A and 204D, and assembly 220A can further include a set of sensor devices 222A which include an IR camera device configured to monitor a portion of environment 201 which is proximate to end 204A of vehicle 200, one or more visible light camera devices configured to monitor portions of environment 201 which are proximate to ends 204A, 204D of vehicle, one or more light beam scanning devices configured to monitor portions of environment 201 which are proximate to ends 204A, 204D of vehicle, etc. In another example, assembly 220D can include a set of light emitter devices 224D which include a tail light device configured to emit one or more light beams into a portion of environment 201 which is proximate to end 204D and a turn light device configured to emit one or more light beams into portions of the environment 201 which are proximate to ends 204B and 204D, and assembly 220D can further include a set of sensor devices 222D which include one or more visible light camera devices configured to monitor portions of environment 201 which are proximate to ends 204A, 204D of vehicle.

In some embodiments, a window 226 included in an assembly 220 provides a common individual aperture via which each of the sensor devices 222 and light emitter devices 224 installed therein can interact with the external environment. A light emitter device 224 interacting with the environment 201 includes the device 224 directing an emitted light beam into a portion of the environment 201, such that the portion of the environment 201 is illuminated by the beam. A sensor device 222 interacting with the environment 201 includes the device 222 monitoring a portion of the environment 201, such that the sensor device 222 generates a sensor data representation of the portion of the environment 201 based on the monitoring. As a result, where an assembly 220 is installed in a gap 206 in the vehicle body 202, the window 226 included in an assembly 220 enables monitoring and illumination of one or more portions of the environment 201 via an individual aperture in the vehicle body 202, thereby reducing the quantity of body apertures included in the vehicle 200.

Sensor data generated by various sensor devices 222A-D, as a result of the sensor devices 222A-D monitoring various portions of the environment 201 which are proximate to various ends 204A-D of vehicle 200, can be communicated to the one or more computer systems 210 via the various communication links 230A-D. The one or more computer systems 210, which can include one or more vehicle navigation systems (VNS), can, based on processing sensor data generated by the various sets of sensor devices 222A-D included in the various assemblies 220A-D, generate one or more characterizations of one the external environment 201, where a characterization includes a characterization of relative velocities, positions, etc. of various static elements and dynamic elements in the environment 201, determining predicted trajectories of various dynamic elements through the environment 201, determining whether a trajectory of the vehicle 200 intersects one or more static elements, dynamic elements, dynamic element predicted trajectories, etc. in the environment, etc. In some embodiments, based on processing the sensor data, generating one or more environment characterizations, etc. the one or more computer systems 210 can provide one or more representations of one or more portions of the environment 201 to one or more users of the vehicle 200, via one or more user interfaces included in the vehicle 200. In some embodiments, based on processing the sensor data, generating one or more environment characterizations, etc., the one or more computer systems 210 can autonomously navigate the vehicle 200 along one or more trajectories which avoid intersections with various static elements, dynamic elements, dynamic element predicted trajectories, etc. in the environment 201.

In some embodiments, separate sensor devices 222 included in separate element assemblies 220 monitor overlapping portions of the environment 201, thereby enabling one or more computer systems 210 which receive and process sensor data generated by separate sensor devices 222 in separate assemblies 220 to generate a characterization of some or all of the environment 201 surrounding the vehicle 200. For example, where assembly 220A includes a sensor device 222A, including a camera device, which generates sensor data representations of portions of environment 201 which are proximate to ends 204A, 204D of vehicle 200, and where assembly 220D includes a sensor device 222D, including a camera device, which generates sensor data representations of portions of environment 201 which are proximate to ends 204B, 204D of vehicle 200, one or more computer systems 210 which receive and process sensor data representations generated by the sensor devices 222A, 222D in the separate assemblies 220A, 220D can synthesize the sensor data representations to generate a continuous sensor data representation of the portions of environment 201 which are proximate to ends 204A, 204D, and 204B of the vehicle 200.

Figure 3:
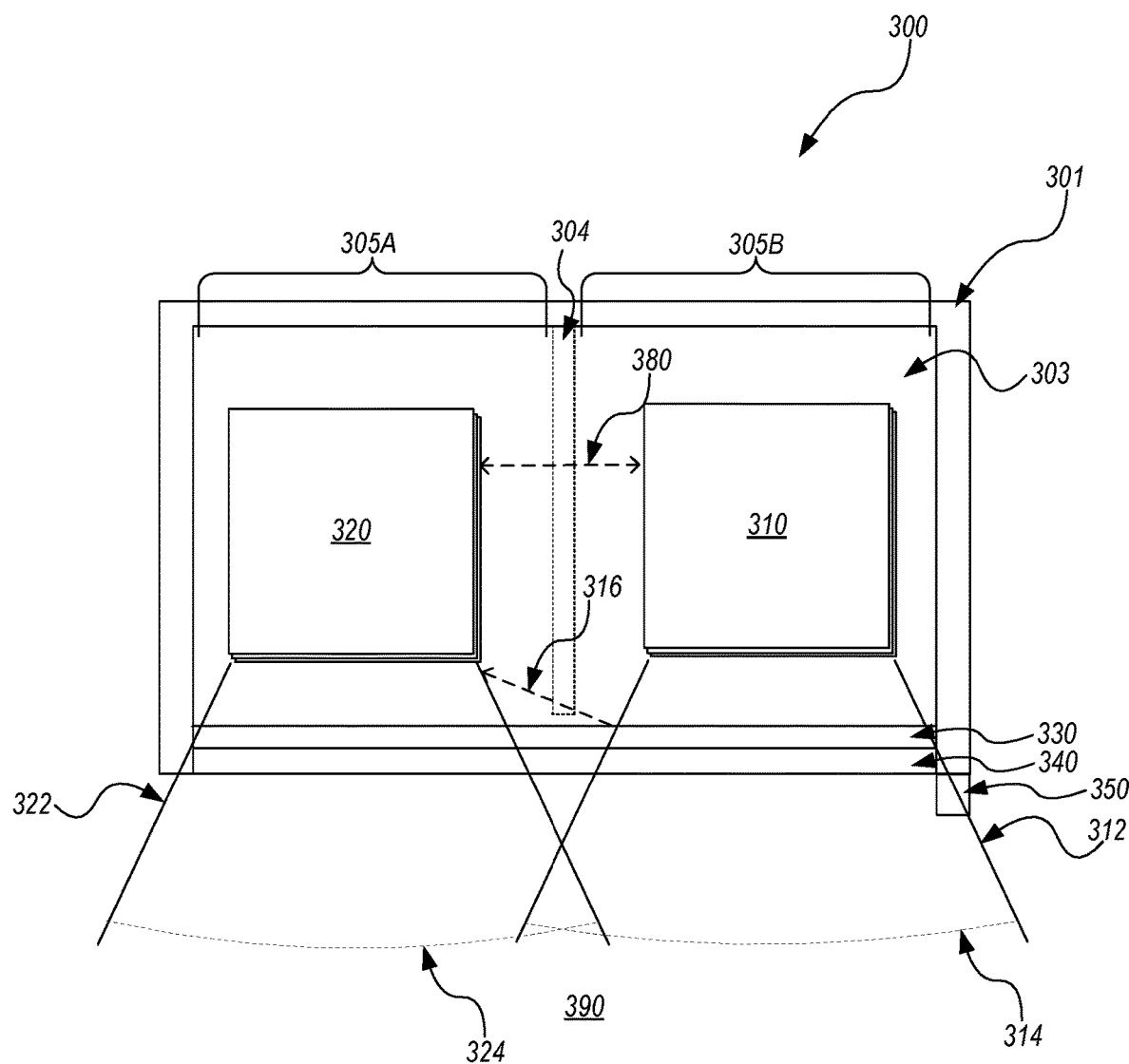
FIG. 3 illustrates a schematic diagram of an element assembly which includes one or more lamp devices and one or more sensor devices included in one or more portions of an assembly housing and configured to interact with an external environment via a common window element, according to some embodiments.

FIG. 3 illustrates a schematic diagram of an element assembly which includes one or more light emitter devices and one or more sensor devices included in one or more portions of an assembly housing and configured to interact with an external environment via a common window element, according to some embodiments. The element assembly 300 illustrated in FIG. 3 can be included in any of the embodiments of element assemblies included herein, including the element assembly 200 illustrated in FIG. 2.

Element assembly 300 includes a housing 301 which at least partially encloses a housing interior space 303 in which various vehicle control elements, sensor devices, etc. can be installed. The assembly 300 includes a window element 340 which encloses a portion of the housing interior space 303 which is encompassed by the housing 301. The portion can be referred to as a gap in the housing 301, and the window element 340 can be referred to as encompassing the gap in the housing 301. The window element 340 can comprise one or more various materials which are at least partially transparent, and the housing 301 can comprise one or more various materials which are at least partially opaque. The assembly 300 is configured to be installed in a gap in a body of a vehicle in an orientation which positions the window element 340 of the assembly 300 to face towards an external environment 390 in which the vehicle is located. As referred to herein, a gap in a body of a vehicle can include a boundary of the interior volume of the vehicle which is not encompassed by one or more body panels, devices, windows, etc. which enclose one or more portions of the vehicle interior, where one or more portions of the vehicle interior includes one or more vehicle cabins, cargo storage spaces, engine spaces, energy storage system spaces, fuel storage system spaces, etc.

As shown in FIG. 3, some embodiments of an element assembly 300 include one or more light emitter devices 310 and one or more sensor devices 320 installed within an interior space 303 of the assembly 300. Each of the light emitter devices 310 and sensor devices 320 included in the element assembly are configured to interact with an external environment 390 via a common window element 340 included in the element assembly 300. For example, where the light emitter devices 310 include a headlight device and the sensor devices 320 include a camera device, the headlight device can interact with the environment 390 via the window element 340 based on the headlight device emitting and directing a light beam into the environment 390 through the window element 340, and the camera device can interact with the environment 390 via the window element 340 based on the camera device capturing an image of a portion of the environment 390 which is encompassed within a field of view of the camera device which extends through the same window element 340.

As shown, each of the sensor devices 320 and light emitter devices 310 are associated with one or more respective fields 322, 312 which represent the respective portions of the external environment 390 with which the respective devices are configured to interact via one or more portions of the common window element 340. In some embodiments, where a sensor device 320 includes a camera device, the corresponding field 322 comprises a field of view of the camera device. In some embodiments, where a sensor device 320 includes a light beam scanning device, the corresponding field 322 comprises a field of view which encompasses a portion of the environment 390 through which an emitted light beam can be directed from the light beam scanning device. In some embodiments, a field 312 associated with a light emitter device 310 comprises a portion of the environment 390 through which a light beam generated at the device 310 can be directed.

In some embodiments, the element assembly 300 is configured to mitigate interference between certain portions of the light emitter devices 310 and sensor devices 320 included therein. For example, where an element assembly 300 includes a light emitter device 310 which is configured to emit a light beam which comprises visible light and a sensor device 320 which is configured to capture visible-light images, the assembly 300 is configured to mitigate interference of the light beam emitted by the light emitter device 310 with the images of environment 390 captured by the sensor device 320.

In some embodiments, to mitigate interference between light emitter devices 310 and sensor devices 320 included therein, an element assembly 300 includes a baffle element 304, also referred to herein as a partition element, which partitions the interior space 303 into separate spaces 305A-B in which separate devices 310, 320 are located. For example, in the illustrated embodiment, the assembly 300 includes a baffle element 304 which partitions the interior space 303 based on the positions of the light emitter devices 310 and sensor devices 320 located in the space, so that the interior space 303 is partitioned into a first space 305A in which the light emitter devices 310 are located and a separate second space 305B in which the sensor devices 320 are located. The baffle element 304, based on partitioning the space 303, can be comprised of at least partially opaque materials, including materials which are at least translucent in at least a range of light wavelengths. The baffle element 304 can establish a physical barrier between separate light emitter devices 310 from sensor devices 320 and mitigate the propagation of light emitted by one or more light emitter devices 310 to one or more sensing elements of one or more sensor devices 320.

In some embodiments, the window element included in the element assembly includes one or more layers, coatings, etc. which mitigate reflection of light emitted by one or more light emitter devices within the housing interior space back to a sensor element of one or more sensor devices included within the housing interior space. Reflected emitted light, particularly reflected light which is in a wavelength that a sensor element included in a sensor device is configured to detect, can interfere with the sensor device monitoring the external environment based on the reflected light being detected at the sensor element and interfering with sensor data generated as a result of the monitoring.

A window layer which includes one or more layers, coatings, etc. can include one or more layers, coatings, etc. configured to mitigate reflection of light having one or more various wavelengths. The one or more layers, coatings, etc. can be located on an interior surface of the window element which faces away from the external environment and faces towards an interior space of the assembly housing, so that the one or more layers, coatings, etc. are protected against damage by environmental elements in the external environment.

As shown in FIG. 3, assembly 300 can include, on an interior surface of window element 340, a reflection mitigation layer 330 which is configured to mitigate reflection 316 of light emitted by one or more light emitter devices 310 located in the interior space 303, thereby mitigating detection of reflected light 316 at one or more sensor elements of one or more sensor devices 320 located in the interior space 303.

In some embodiments, as shown in FIG. 3, a baffle element 304 included in the interior space 303 can sufficiently partition the space 330 into separate portions to block light emitted by one or more light emitter devices 310 which is reflected from an interior surface of the window element 340 back into the interior space 303.

In some embodiments, an element assembly includes one or more window element cleaner devices which are configured to remove environmental elements from an exterior surface of the window element included in the element assembly to mitigate obstruction of light beams emitted by one or more light emitter devices by the environmental elements. As shown in FIG. 3, assembly 300 can include a cleaner device 350 which is configured to remove environmental elements from the exterior surface of the window element 340 which faces towards the external environment 390. Because the assembly can include one or more sensor devices which are configured to monitor an external environment via the same window element via which the one or more light emitter devices emit light beams into the external environment, interference of environmental elements on the exterior surface of the window element with monitoring of the external environment by the one or more sensor devices can be mitigated as a result of the cleaner device removing the environmental elements from the exterior surface of the window elements.

In some embodiments, one or more light emitter devices in an element assembly are communicatively coupled, via one or more communication conduits, to one or more sensor devices included in the element assembly, where a particular one or more of the light emitter devices and the sensor devices are configured to be adjustably controlled based on another one or more of the light emitter devices and the sensor devices. For example, as shown in FIG. 3, a light emitter device 310 and a sensor device 320 can be communicatively coupled via a communication link 380, and the emission of light beams 312 by the light emitter device 310 can be adjustably controlled based on the sensor device 320 monitoring the external environment 390, so that the device 310 is precluded from emitting the light beam 312 concurrently with the sensor device 320 monitoring the external environment 390. The device 310 can emit a light beam in one or more series of pulses, where the gaps between light pulses are synchronized with separate individual monitoring actions by the sensor device 320. As a result, interference by the light emitted by one or more light emitter devices 310 with monitoring of environment 390 by one or more sensor devices 320 can be at least partially mitigated, thereby augmenting the sensor data representations of the environment 390 generated by the sensor device 320 as a result of monitoring the environment 390.

In another example, sensor device 320 can receive a command from a remote computer system, which can include a VNS included in a vehicle in which assembly 300 is installed and to which the sensor device 320 is communicatively coupled, to monitor a portion of the external environment 390. Based on receiving the command, device 320 can control the light emitter device 310 to at least partially restrict light beam emission during a limited period of time and device 320 can further monitor the external environment 390 during the limited period of time. The limited period of time can be a series of points in time, such that device 320 controls the device 310 to "pulse" the emitted light beam 312 at a frequency which can exceed a threshold frequency of human observation, including a frequency of 60 Hz, and device 320 can monitor the environment 390 in a series of pulses which are at the same frequency and at 180 degrees out of phase with the pulsed light beam emitted by the device 310. As a result, device 310 can be controlled to pulse the emitted beam 312 and device 320 can monitor the environment 390 between separate light beam 312 pulses, so that interference between the light beam 312 and the monitoring 322 is at least partially mitigated. In some embodiments, one or more of devices 310 and 320 are adjustably controlled, to mitigate concurrent light beam emission 312 and environment monitoring 322, at one or more remote computer systems external to the assembly 330 can be communicatively coupled to the devices 310, 320 via one or more communication links.

An individual monitoring of the external environment 390 by a sensor device 320 can include the device 320 capturing a set of one or more images of the environment 390, emitting one or more light beams into the environment and detecting one or more reflections of the one or more light beams off of one or more objects in the environment 390, etc.

Figure 4:
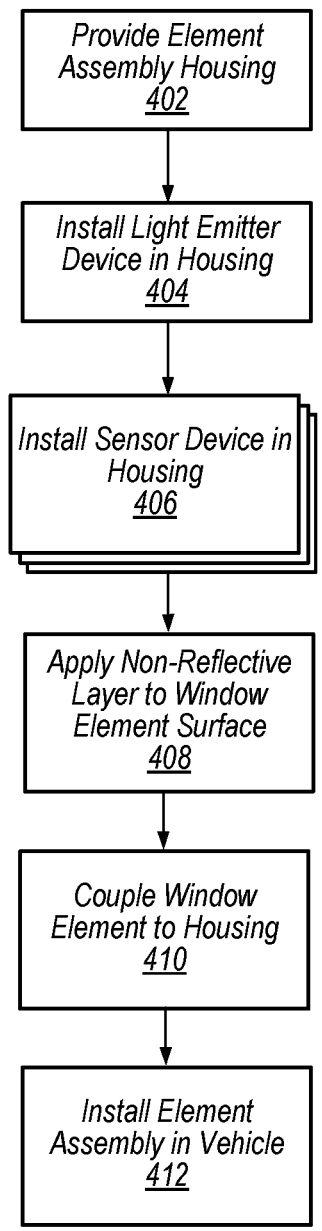
FIG. 4 illustrates fabricating an element assembly, according to some embodiments.

FIG. 4 illustrates fabricating an element assembly, according to some embodiments. The fabricating can be implemented with regard to any of the embodiments of element assemblies described herein, including the assembly 300 shown in FIG. 3.

At 402, a housing of the element assembly is provided. The element assembly housing can include one or more interior spaces which are at least partially enclosed by the housing.

At 404, one or more light emitter devices are installed in one or more interior spaces of the housing. The installing at 404 can include coupling the one or more light emitter devices to one or more structural mounting interfaces, electrical connection interfaces, communication connection interfaces, some combination thereof, etc.

At 406, one or more sensor devices are installed in one or more interior spaces of the housing. The installing at 406 can include coupling the one or more sensor devices to one or more structural mounting interfaces, electrical connection interfaces, communication connection interfaces, some combination thereof, etc. The installing at 406 can include communicatively coupling one or more sensor devices with one or more light emitter devices installed in one or more interior spaces at 404.

At 408, one or more layers, coatings, etc. are applied to a particular surface of a window element which is configured to be coupled to the assembly housing. The one or more layers, coatings, etc. can include one or more non-reflective layers, coatings, etc. configured to at least partially mitigate reflection of incident light at one or more sets of wavelengths. In some embodiments, the application at 408 includes applying multiple layers, coatings, etc. to a particular surface of the window element. The particular surface can include an interior surface configured to be partitioned from an external environment when the window element is coupled to the element assembly housing.

At 410, the window element is coupled to the housing. Coupling the window element to the housing can include coupling the window element to the housing in a particular configuration which results in the interior surface of the window element, on which one or more layers, coatings, etc. are applied at 408, facing into the housing interior spaces in which the one or more sensor devices and light emitter devices are installed.

At 412, the element assembly is installed in a vehicle. The installing can include physically coupling the assembly housing with one or more portions of the vehicle, electrically coupling the one or more light emitter devices and one or more sensor devices installed in the assembly to one or more power transmission lines, communication links, etc., included in the vehicle, some combination thereof, etc.

Figure 5:
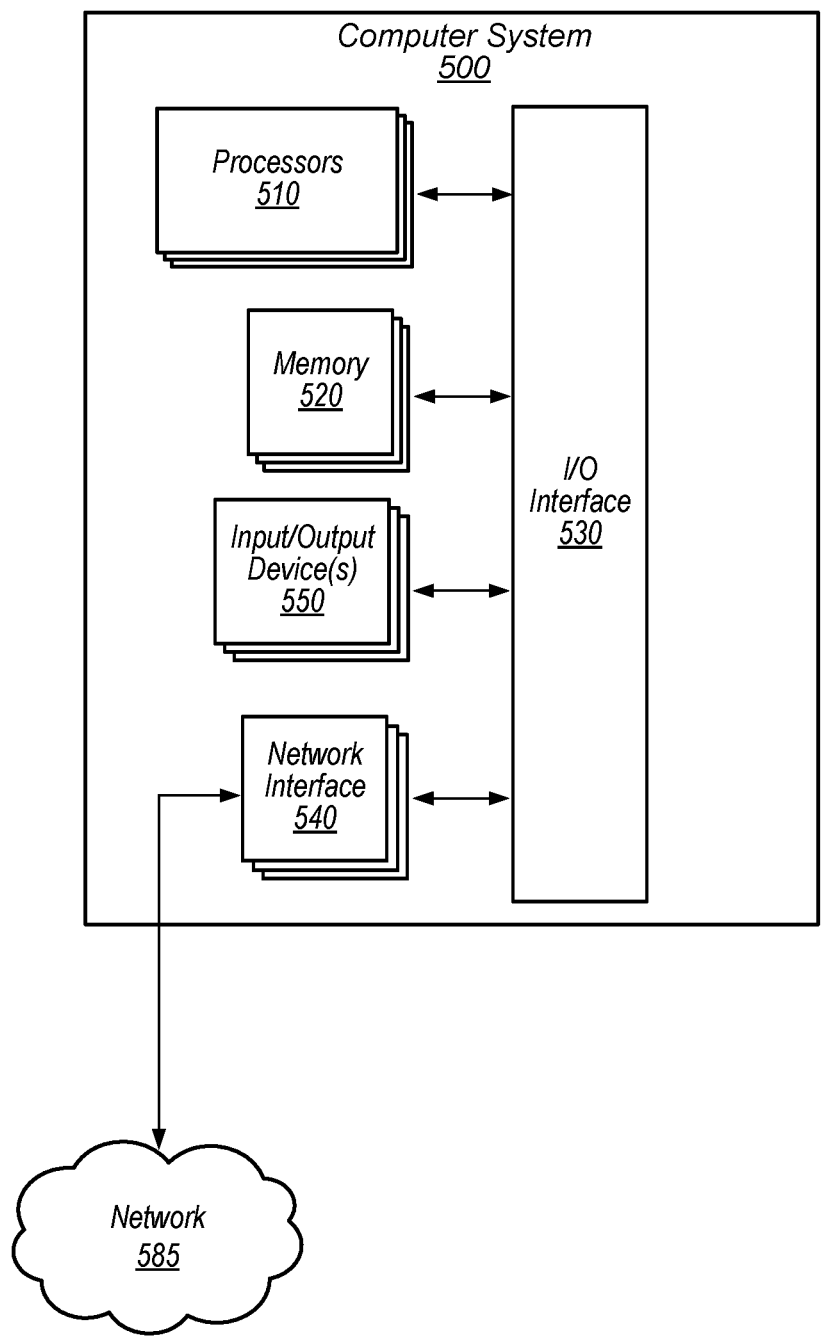
FIG. 5 illustrates a computer system that may be configured to include or execute any or all of the embodiments described herein.

FIG. 5 illustrates an example computer system 500 that may be configured to include or execute any or all of the embodiments described above. In different embodiments, computer system 500 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a VNS, sensor device, light emitter device, some combination thereof, etc., as described herein, may be executed in one or more computer systems 500, which may interact with various other devices. Note that any component, action, or functionality described above with respect to FIG. 1 through 4 may be implemented on one or more computers configured as computer system 500 of FIG. 5, according to various embodiments. In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices, which can include one or more user interface devices. In some cases, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store program instructions, data, etc. accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 520 may be configured to implement some or all of a control system incorporating any of the functionality described above. Additionally, existing automotive component control data of memory 520 may include any of the information or data structures described above. In some embodiments, program instructions and/or data may be received, sent or stored upon different types of computer-accessible media or on similar media separate from system memory 520 or computer system 500. While computer system 500 is described as implementing the functionality of functional blocks of previous Figures, any of the functionality described herein may be implemented via such a computer system.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network 585 (e.g., carrier or agent devices) or between nodes of computer system 500. Network 585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 500. Multiple input/output devices may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

Memory 520 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
   an element assembly configured to be installed in a vehicle and provide illumination of at least a portion of an external environment in which the vehicle is located and monitoring of at least a portion of the external environment via a common aperture, wherein the element assembly comprises:
   a housing which comprises an interior space which is at least partially enclosed by the housing and is configured to support at least one light emitter device and at least one sensor device coupled to the housing within the interior space; and
   a window element coupled to the housing, wherein the window element provides a transparent barrier between the interior space and the external environment, such that the at least one light emitter device is configured to direct a light beam within a visible wavelength range into the external environment through the window element and the at least one sensor device is configured to detect a non-visible wavelength range to monitor at least a portion of the external environment through the window element.

2. The apparatus of claim 1, wherein the element assembly comprises:
   at least one non-reflective layer applied to an interior surface of the window element, wherein the at least one non-reflective layer is configured to mitigate reflection of light emitted by the at least one light emitter device to one or more sensing elements of the at least one sensor device.

3. The apparatus of claim 1, wherein the element assembly comprises:
   at least one partition element, comprised of at least one opaque material and located between the at least one light emitter device and the at least one sensor device, which is configured to at least partially block light emitted by one or more light emitter devices from reaching one or more sensing elements of one or more sensor devices.

4. The apparatus of claim 1, wherein the element assembly is configured to:
   adjustably control light beam emission by the at least one light emitter device to preclude the at least one light emitter device from emitting light beams concurrently with the at least one sensor device monitoring the at least one portion of the external environment.

5. The apparatus of claim 4, wherein:
the at least one light emitter device is configured to emit the light beam in one or more series of light pulses, wherein gaps between light pulses are synchronized with separate individual monitoring actions by the sensor device.

6. The apparatus of claim 4, comprising:
at least one computer system which is communicatively coupled to the element assembly and is configured to control the at least one light emitter device and the at least one sensor device.

7. The apparatus of claim 1, further comprising:
one or more cleaning elements configured to remove environmental elements from the window element.

8. The apparatus of claim 1, comprising:
a plurality of the element assemblies, each installed in a separate portion of the vehicle, which are collectively configured to provide monitoring of the at least one portion of the external environment.

9. A method, comprising:
configuring an element assembly to provide illumination of at least a portion of an external environment and monitoring of at least a portion of the external environment via a common aperture, wherein the configuring comprises:
providing a housing which comprises an interior space which is at least partially enclosed by the housing and is configured to support at least one light emitter device and at least one sensor device coupled to the housing within the interior space; and
coupling a window element to the housing, wherein the window element provides a transparent barrier between the interior space and the external environment, such that the at least one light emitter device is configured to direct a light beam within a visible wavelength range into the external environment through the window element and the at least one sensor device is configured to detect a non-visible wavelength range to monitor at least a portion of the external environment through the window element.

10. The method of claim 9, comprising:
applying at least one non-reflective layer applied to an interior surface of the window element, wherein the at least one non-reflective layer is configured to mitigate reflection of light emitted by the at least one light emitter device to one or more sensing elements of the at least one sensor device.

11. The method of claim 9, comprising:
coupling at least one partition element, comprised of at least one opaque material, between separate portions of the interior space configured to separately support the at least one light emitter device and the at least one sensor device,
wherein the at least one partition element is configured to at least partially block light emitted by one or more light emitter devices from reaching one or more sensing elements of one or more sensor devices.

12. The method of claim 9, comprising:
adjustably controlling light beam emission by the at least one light emitter device to preclude the at least one light emitter device from emitting light beams concurrently with the at least one sensor device monitoring the at least one portion of the external environment.

13. The method of claim 9, wherein:
the at least one light emitter device is configured to emit the light beam in one or more series of light pulses, wherein gaps between light pulses are synchronized with separate individual monitoring actions by the sensor device.

14. The method of claim 9, further comprising:
removing, with one or more cleaning elements, environmental elements from the window element.

15. A vehicle configured to be navigated through an external environment, wherein the vehicle comprises:
a set of element assemblies which are each configured to provide illumination to at least one portion of the external environment and which are collectively configured to monitor an entirety of the external environment, wherein each element assembly comprises:
a housing which comprises an interior space which is at least partially enclosed by the housing and which further comprises at least one light emitter device and at least one sensor device coupled to the housing within the interior space; and
a window element coupled to the housing, wherein the window element provides a transparent barrier between the interior space and the external environment, such that the at least one light emitter device is configured to direct a light beam within a visible wavelength range into the external environment through the window element and the at least one sensor device is configured to detect a non-visible wavelength range to monitor at least a portion of the external environment through the window element.

16. The vehicle of claim 15, wherein at least one element assembly, of the set of element assemblies, comprises:
at least one non-reflective layer applied to an interior surface of the window element, wherein the at least one non-reflective layer is configured to mitigate reflection of light emitted by the at least one light emitter device to one or more sensing elements of the at least one sensor device.

17. The vehicle of claim 15, wherein at least one element assembly, of the set of element assemblies, comprises:
at least one partition element, comprised of at least one opaque material and located between the at least one light emitter device and the at least one sensor device, which is configured to at least partially block light emitted by one or more light emitter devices from reaching one or more sensing elements of one or more sensor devices.

18. The vehicle of claim 15, comprising:
at least one computer system, communicatively coupled to each element assembly of the set of element assemblies, which is configured to adjustably control light beam emission by at least one light emitter device of at least one element assembly to preclude the at least one light emitter device from emitting light beams concurrently with at least one sensor device of at least one element assembly monitoring at least one portion of the external environment.

19. The vehicle of claim 18, wherein:
the at least one light emitter device is configured to emit the light beam in one or more series of light pulses, wherein gaps between light pulses are synchronized with separate individual monitoring actions by the sensor device.

20. The vehicle of claim 15, wherein at least one element assembly, of the set of element assemblies, comprises:
one or more cleaning elements configured to remove environmental elements from the window element.

* * * * *